US012572359B2

(12) United States Patent
Heinecke et al.

(10) Patent No.: US 12,572,359 B2
(45) Date of Patent: Mar. 10, 2026

(54) 8-BIT FLOATING POINT SQUARE ROOT AND/OR RECIPROCAL SQUARE ROOT INSTRUCTIONS

(71) Applicant: Intel Corporation, Santa Clara, CA (US)

(72) Inventors: Alexander Heinecke, San Jose, CA (US); Menachem Adelman, Modi'in (IL); Evangelos Georganas, San Jose, CA (US); Amit Gradstein, Binyamina (IL); Christopher Hughes, Santa Clara, CA (US); Naveen Mellempudi, Bangalore (IN); Simon Rubanovich, Haifa (IL); Uri Sherman, Bustan Hagalil (IL); Zeev Sperber, Zikhron Yaakov (IL)

(73) Assignee: Intel Corporation, Santa Clara, CA (US)

(*) Notice: Subject to any disclaimer, the term of this patent is extended or adjusted under 35 U.S.C. 154(b) by 649 days.

(21) Appl. No.: 17/958,371

(22) Filed: Oct. 1, 2022

(65) Prior Publication Data

US 2024/0045683 A1 Feb. 8, 2024

(51) Int. Cl.
*G06F 9/30* (2018.01)

(52) U.S. Cl.
CPC ........ *G06F 9/30145* (2013.01); *G06F 9/3001* (2013.01); *G06F 9/30036* (2013.01); *G06F 9/30038* (2023.08)

(58) Field of Classification Search
None
See application file for complete search history.

(56) References Cited

U.S. PATENT DOCUMENTS

| | | | |
|---|---|---|---|
| 4,815,021 A | 3/1989 | Steiner et al. | |
| 6,714,197 B1* | 3/2004 | Thekkath | G06F 9/30025 |
| | | | 345/522 |
| 2005/0027772 A1* | 2/2005 | Enenkel | G06F 7/5525 |
| | | | 708/502 |

(Continued)

FOREIGN PATENT DOCUMENTS

| | | |
|---|---|---|
| GB | 2186105 A | 8/1987 |
| WO | 2014/035448 A1 | 3/2014 |

OTHER PUBLICATIONS

Mellempudi, Naveen, et al., Mixed Precision Training With 8-bit Floating Point, 2019, arXiv,10 pages. (Year: 2019).*

(Continued)

*Primary Examiner* — Eric Coleman
(74) *Attorney, Agent, or Firm* — Nicholson De Vos Webster & Elliott LLP

(57) ABSTRACT

Techniques for performing square root or reciprocal square root calculations on FP8 data elements in response to an instruction are described. An example of an instruction is one that includes fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand.

20 Claims, 20 Drawing Sheets

(56) References Cited

U.S. PATENT DOCUMENTS

| | | | |
|---|---|---|---|
| 2005/0168481 A1* | 8/2005 | Wilt .................... | H04N 1/6016 |
| | | | 345/604 |
| 2019/0196790 A1* | 6/2019 | Anderson ........... | G06F 9/30145 |
| 2023/0061618 A1* | 3/2023 | Adelman ............. | G06F 9/3001 |

OTHER PUBLICATIONS

Moroz, Leonid, et al., Efficient Floating-Point Square Root and Reciprocal Square Root Algorithms, 2021, IEEE, pp. 552-559. (Year: 2021).*

Park,J. et al. , A 40nm 4.81TFLOPS/W 8b Floating-Point Training Processor for Non-Sparse Neural Networks Using Shared Exponent Bias and 24-Way Fused Multiply-Add Tree, 2021,IEEE,IEEE Intl. Solid-State Circuits Conference ,3 pages. (Year: 2021).*

Intel, Architecture Instruction Set Extensions Programming reference, Intel. (Aug. 1, 2015), pp. 5-876 ,5-877) (Year: 2015).*

Extended European Search Report and Search Opinion, EP App. No. 23183129.8, Dec. 12, 2023, 08 pages.

Office Action, EP App. No. 23183129.8, Nov. 18, 2024, 4 pages.

* cited by examiner

VRSQRTNEPFP8 DEST{WRITEMASK}, SOURCE

WRITEMASK REGISTER 331

PACKED DATA SOURCE 1 (SRC1) 301

OTHER CIRCUITRY 319

DOWNCONVERT CIRCUITRY 318

RECIPROCAL SQUARE ROOT CIRCUITRY 313

UPCONVERT CIRCUITRY 312

BIAS 305

BIAS 305

EXECUTION CIRCUITRY 309

WRITMASK CIRCUITRY 321

PACKED DATA DESTINATION (DST) 331

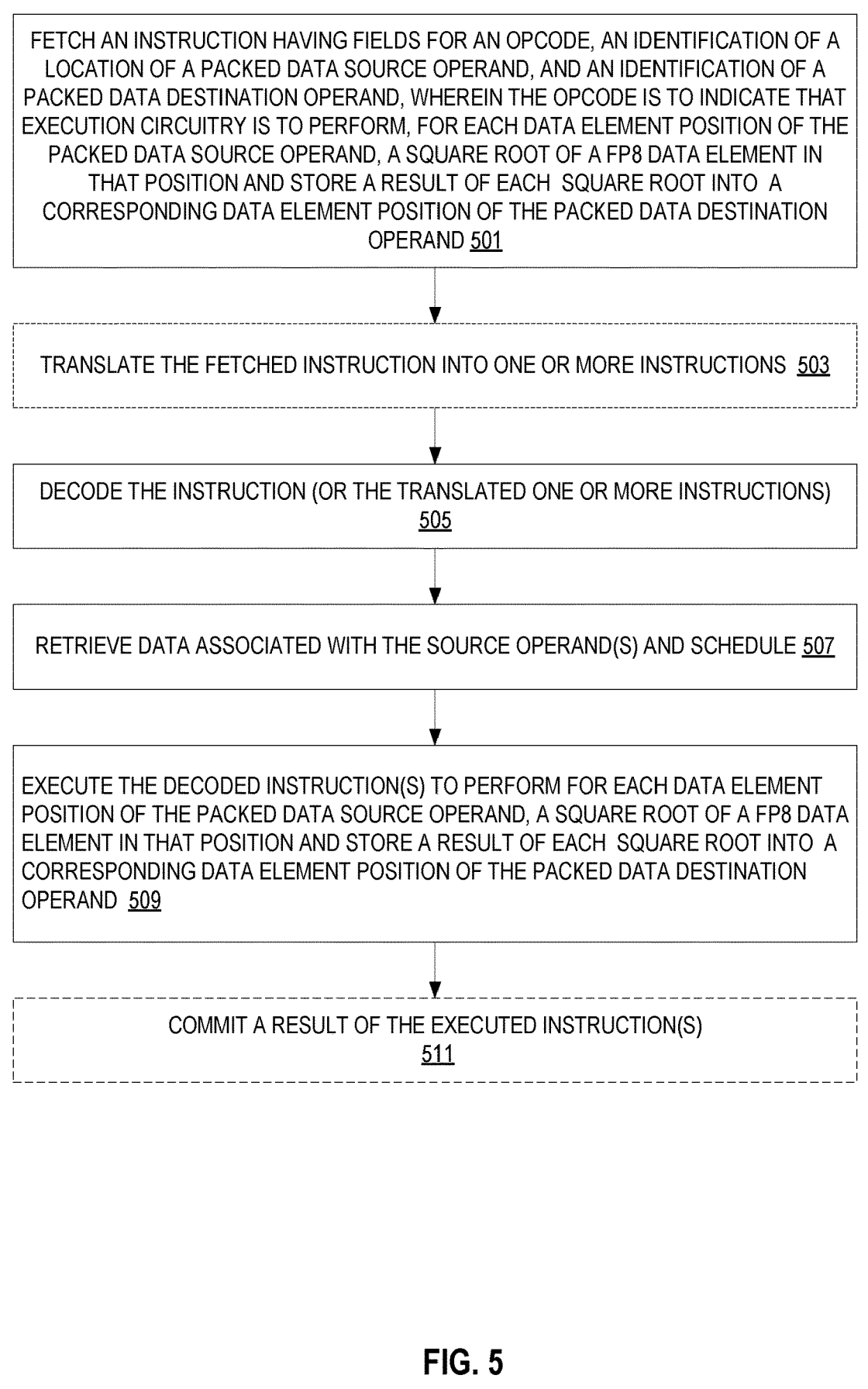

FETCH AN INSTRUCTION HAVING FIELDS FOR AN OPCODE, AN IDENTIFICATION OF A LOCATION OF A PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERAND, A SQUARE ROOT OF A FP8 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 501

TRANSLATE THE FETCHED INSTRUCTION INTO ONE OR MORE INSTRUCTIONS 503

DECODE THE INSTRUCTION (OR THE TRANSLATED ONE OR MORE INSTRUCTIONS) 505

RETRIEVE DATA ASSOCIATED WITH THE SOURCE OPERAND(S) AND SCHEDULE 507

EXECUTE THE DECODED INSTRUCTION(S) TO PERFORM FOR EACH DATA ELEMENT POSITION OF THE PACKED DATA SOURCE OPERAND, A SQUARE ROOT OF A FP8 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 509

COMMIT A RESULT OF THE EXECUTED INSTRUCTION(S) 511

FIG. 5

```
VSQRTNEPFP8 DEST {K1}, SRC
(KL, VL) = (16, 128), (32, 256), (64, 512)

FOR J := 0 TO KL-1
        IF K1[J] OR * NO WRITEMASK *
                IF SRC IS MEMORY AND (EVEX.B == 1) //BROADCAST SET IN THIRD PREFIX
                        TSRC := SRC.FP8[0]
                ELSE:
                        TSRC := SRC.FP8[J]
                DEST.FP8[J] := SQRT(TSRC) // DAZ, FTZ, RNE, SAE
        ELSE IF *ZEROING*
                DEST.FP8[J] :=0
        // ELSE DEST.FP8[J] REMAINS UNCHANGED

DEST[MAX_VL-1:VL] := 0
```

FIG. 6(A)

```
VSQRTNEPFP8 DEST {K1}, SRC
(KL, VL) = (16, 128), (32, 256), (64, 512)

FOR J := 0 TO KL-1
        IF K1[J] OR * NO WRITEMASK *
                IF SRC IS MEMORY AND (EVEX.B == 1) //BROADCAST SET IN THIRD PREFIX
                        TSRC = CVT_FP8_FP16(SRC.FP8[0])
                ELSE:
                        TSRC := CVT_FP8_FP16(SRC.FP8[J])
                TMP1 = SQRT(TSRC) // DAZ, FTZ, RNE, SAE
                DEST.FP8[J] := CVT_FP16_FP8(TMP1)
        ELSE IF *ZEROING*
                DEST.FP8[J] :=0
        // ELSE DEST.FP8[J] REMAINS UNCHANGED

DEST[MAX_VL-1:VL] := 0
```

FIG. 6(B)

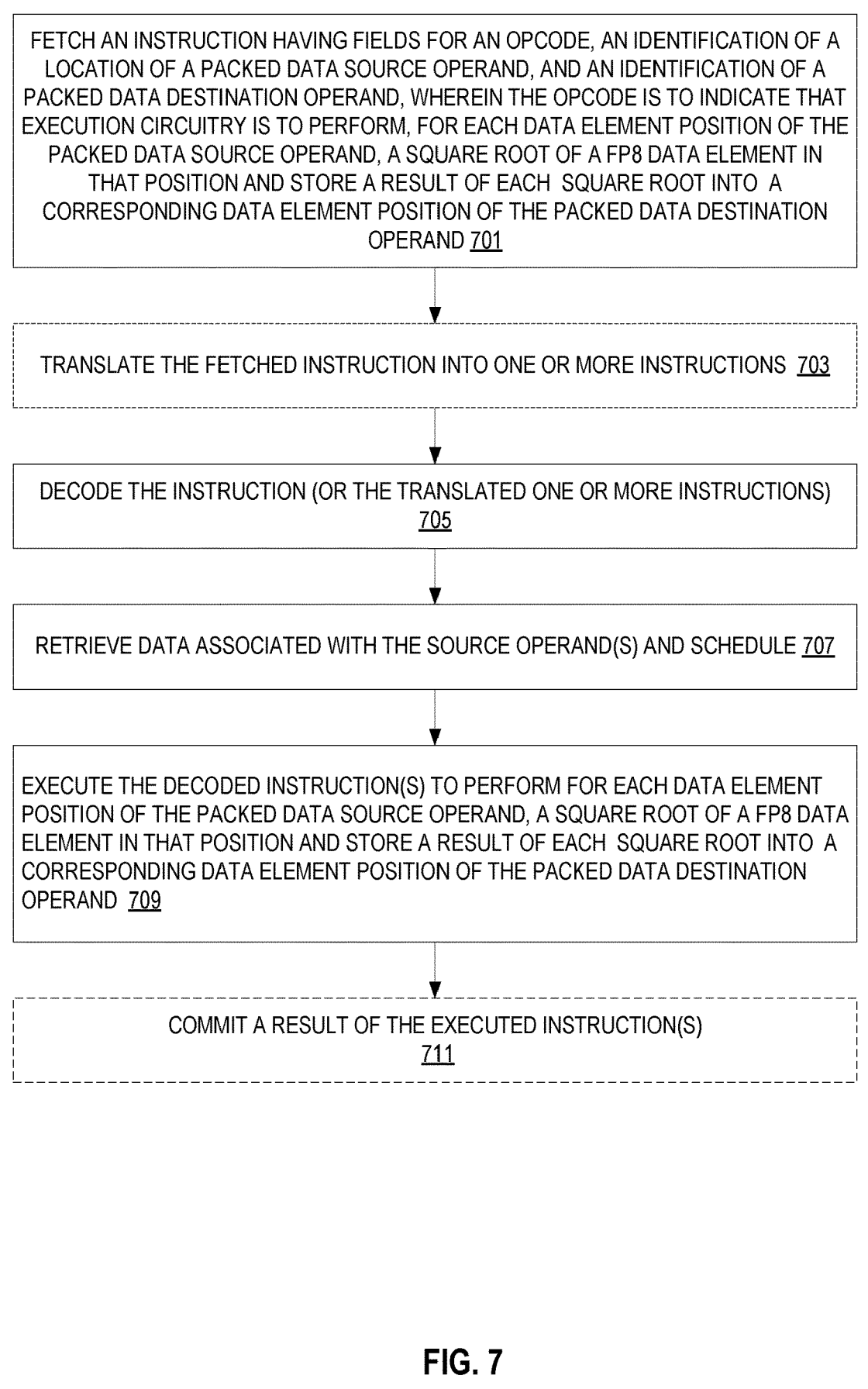

FETCH AN INSTRUCTION HAVING FIELDS FOR AN OPCODE, AN IDENTIFICATION OF A LOCATION OF A PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERAND, A SQUARE ROOT OF A FP8 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 701

TRANSLATE THE FETCHED INSTRUCTION INTO ONE OR MORE INSTRUCTIONS 703

DECODE THE INSTRUCTION (OR THE TRANSLATED ONE OR MORE INSTRUCTIONS) 705

RETRIEVE DATA ASSOCIATED WITH THE SOURCE OPERAND(S) AND SCHEDULE 707

EXECUTE THE DECODED INSTRUCTION(S) TO PERFORM FOR EACH DATA ELEMENT POSITION OF THE PACKED DATA SOURCE OPERAND, A SQUARE ROOT OF A FP8 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 709

COMMIT A RESULT OF THE EXECUTED INSTRUCTION(S) 711

FIG. 7

```
VRSQRTNEPFP8 DEST {K1}, SRC
(KL, VL) = (16, 128), (32, 256), (64, 512)

FOR J := 0 TO KL-1
        IF K1[J] OR * NO WRITEMASK *
                IF SRC IS MEMORY AND (EVEX.B == 1) //BROADCAST SET IN THIRD PREFIX
                        TSRC := SRC.FP8[0]
                ELSE:
                        TSRC := SRC.FP8[J]
                DEST.FP8[J] := APPROXIMATE(1.0 / SQRT(TSRC)) // DAZ, FTZ, RNE, SAE
        ELSE IF *ZEROING*
                DEST.FP8[J] :=0
        // ELSE DEST.FP8[J] REMAINS UNCHANGED

DEST[MAX_VL-1:VL] := 0
```

FIG. 8(A)

```
VRSQRTNEPFP8 DEST {K1}, SRC
(KL, VL) = (16, 128), (32, 256), (64, 512)

FOR J := 0 TO KL-1
        IF K1[J] OR * NO WRITEMASK *
                IF SRC IS MEMORY AND (EVEX.B == 1) //BROADCAST SET IN THIRD PREFIX
                        TSRC = CVT_FP8_FP16(SRC.FP8[0])
                ELSE:
                        TSRC := CVT_FP8_FP16(SRC.FP8[J])
                TMP1 = APPROXIMATE(1.0 /SQRT(TSRC)) // DAZ, FTZ, RNE, SAE
                DEST.FP8[J] := CVT_FP16_FP8(TMP1)
        ELSE IF *ZEROING*
                DEST.FP8[J] :=0
        // ELSE DEST.FP8[J] REMAINS UNCHANGED

DEST[MAX_VL-1:VL] := 0
```

FIG. 8(B)

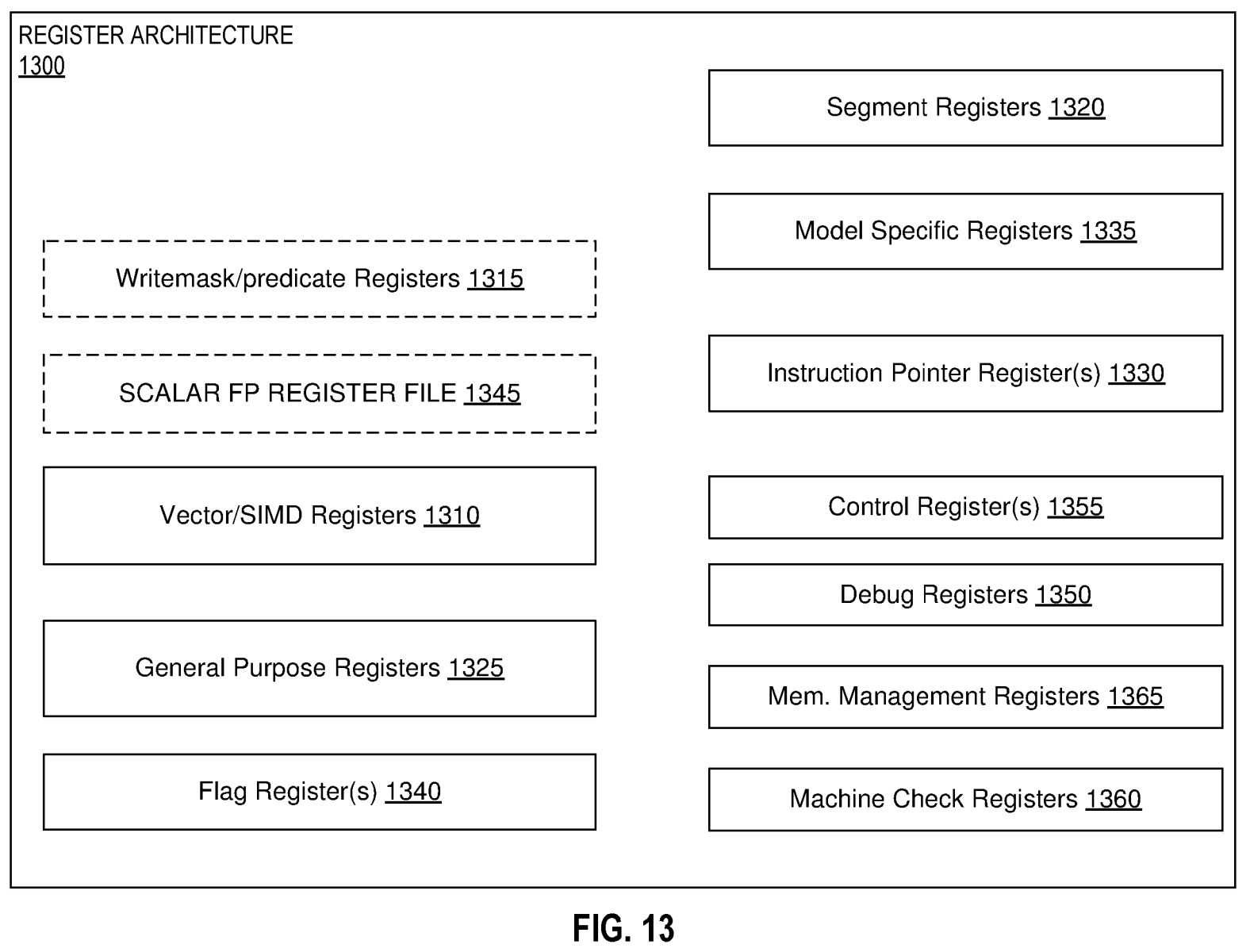

REGISTER ARCHITECTURE
1300

Writemask/predicate Registers 1315

SCALAR FP REGISTER FILE 1345

Vector/SIMD Registers 1310

General Purpose Registers 1325

Flag Register(s) 1340

Segment Registers 1320

Model Specific Registers 1335

Instruction Pointer Register(s) 1330

Control Register(s) 1355

Debug Registers 1350

Mem. Management Registers 1365

Machine Check Registers 1360

FIG. 13

8-BIT FLOATING POINT SQUARE ROOT AND/OR RECIPROCAL SQUARE ROOT INSTRUCTIONS

BACKGROUND

In recent years fused-multiply-add (FMA) units with lower-precision multiplications and higher-precision accumulation have proven useful in machine learning/artificial intelligence applications, most notably in training deep neural networks due to their extreme computational intensity. Compared to classical IEEE-754 32-bit (FP32) and 64-bit (FP64) arithmetic, this reduced precision arithmetic can naturally be sped up disproportional to their shortened width.

BRIEF DESCRIPTION OF DRAWINGS

Various embodiments in accordance with the present disclosure will be described with reference to the drawings, in which:

FIG. 5 illustrates an embodiment of method performed by a processor to process a calculate a square root of FP8 data elements instruction.

FIGS. 6(A)-(B) illustrate examples of pseudo code representing the execution and format of a square root of FP8 data elements instruction.

FIG. 7 illustrates an embodiment of method performed by a processor to process a calculate a reciprocal square root of FP8 data elements instruction.

FIGS. 8(A)-(B) illustrates examples of pseudocode representing the execution and format of a reciprocal square root of FP8 data elements instruction.

FIG. 13 is a block diagram of a register architecture according to some examples.

DETAILED DESCRIPTION

The present disclosure relates to methods, apparatus, systems, and non-transitory computer-readable storage media for calculating square roots or reciprocal square roots of FP8 data elements.

Figure 1:
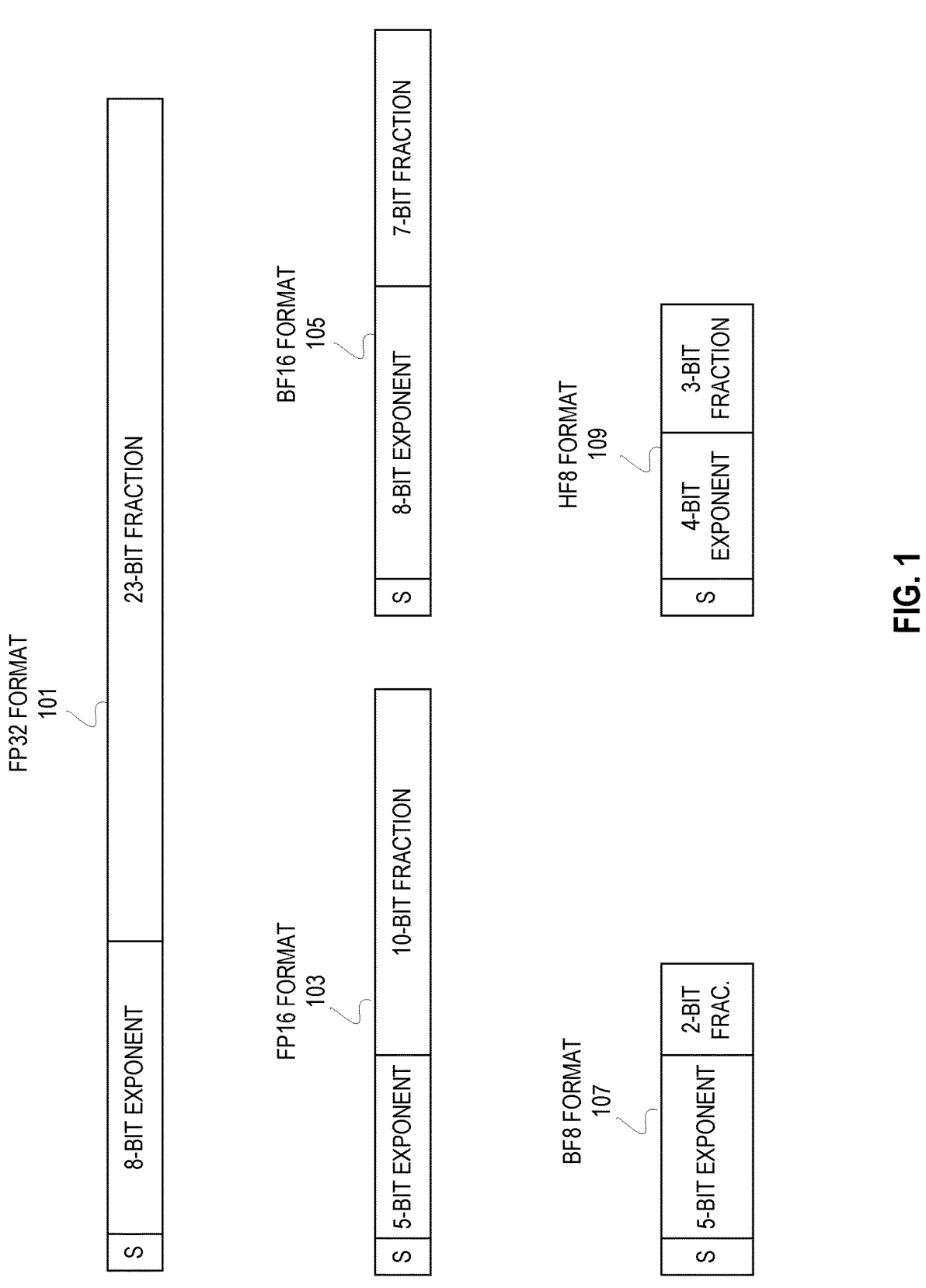
FIG. 1 illustrates different floating point representation formats.

FP8 is gaining traction due to its ability to work well in machine learning algorithms, in particular deep learning training. FIG. 1 illustrates different floating point representation formats. In this illustration, the formats are in little endian format, however, in some embodiments, a big endian format is used. The FP32 format 101 has a sign bit (S), an 8-bit exponent, and a 23-bit fraction (a 24-bit mantissa that uses an implicit bit). The FP16 format 103 has a sign bit (S), a 5-bit exponent, and a 10-bit fraction. The BF16 format 105 has a sign bit (S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

In some examples, an 8-bit floating point format (FP8) provides some advantages over a larger floating point format. For example, an 8-bit floating point format may reduce pressure on memory and bandwidth used for machine learning (such as weights, activations, and gradient values used for training and/or inference of neural networks). As shown, the IEEE and BF16 formats have a fixed number of bits allocated to the fraction (or mantissa which is the fraction bits+1 bit) and exponent fields. Additionally, in some examples, a fixed exponent bias may be provided for a FP16 or BF16 number. As eight bits allows for a small number of mantissa and exponent bits than FP16 or BF16 it may be advantageous to have some variance in FP8 formats (e.g., ensure high accuracy and convergence when training machine learning models).

In machine learning, different parameters, namely weights, gradients and activations, have different precision and range requirements to achieve high training accuracy and/or convergence. This allows for different allocations of the number of exponent and fraction (mantissa bits) depending on the parameter being represented.

An example FP8 format is shown in 107. In some examples, this is called a bfloat8-bit floating point (BF8) format. As shown, this format uses 1 bit for a sign, 5 bits for the exponent, and 2 bits for the fraction (or 1+2 bits for the mantissa). An example FP8 format is shown in 109. In some examples, this is called a hybrid8-bit floating point (HF8) format. As shown, this format uses 1 bit for a sign, 4 bits for the exponent, and 3 bits for the fraction (or 1+3 bits for the mantissa).

Normalized numbers, subnormal (denormal) numbers, and zeroes are supported in both FP8 formats. In some examples, infinity and not-a-number (NaN) encodings are not supported, however, in some examples one or more are. In examples where infinities are not supported, a maximum exponent value is not reserved for encoding NaN and +/− infinity and just used to represent normalized floating-point numbers.

In examples where infinities and NaN are not supported, these are mapped to a single "all-ones" bit sequence with input sign bit preserved (0x7F or 0xFF) or "negative zero" (0x80). In some examples, for a NaN on an overflow, the value may be upconverted to IEEE754 NaN. In some examples, infinities and NaN raise exceptions for a hardware status register to delineate NaN from overflow.

In some examples, a zero is represented by an encoding with all zeroes the exponent and the fraction. Encodings with an all zero exponent and non-zero fraction represent denormal numbers. In the HF8 format, an exponent=$0000_2$ and mantissa=$000_2$ represents numerical value of zero, while exponent=$0000_2$ and mantissa=$001_2$, $010_2$, $011_2$, $100_2$, $101_2$, $110_2$, and $111_2$ represent the denormal numbers. Similarly, in the BF8 format an exponent=$00000_2$ and mantissa=$00_2$ represents numerical value of zero, while exponent=$00000_2$ and mantissa=$01_2$, $10_2$, and $11_2$ represent the denormal numbers.

In some examples, the FP8 formats utilize a variable exponential bias (e.g., a 6-bit unsigned integer value used as a bias). A bias skews the range of representable values more on the smaller numeric values at the expense of larger numerical values. In these examples, a numerical value of a normalized floating point number is $(1)^{sign} \times 2^{exponent-bias} \times$ 1.mantissa and the numerical value of a denormal floating point number is $(1)^{sign} \times 2^{exponent-bias} \times 0$.mantissa. In some examples, the bias is provided by one or more packed data registers (e.g., SIMD or vector) where each data element position of the one or more packed data registers is to provides a bias value for a corresponding data element position of a source and/or destination. In some examples, the bias is provided by one or more general purpose registers where each general purpose register provides a bias to be used for each data element of a particular source and/or destination. Note that in some examples, a single general purpose register is used for a plurality of sources and/or destination. In some examples, the maximum bias is 16 for BF8 and 8 for HF8.

In some examples, not-a-number (NANs) and infinities are defined similarly to other IEEE floating points format, using an all-ones exponents. However, it is also acceptable in some examples to define versions of instructions that support other formats where either "negative zero" or "all-ones" bit-sequence (both exponent and mantissa with sign preserved) is used to denote NANs and infinities, and the all-ones exponent is used to encode normal floating point numbers.

In some examples, hardware support for FP8 supports one or more status (condition code) flags: invalid, denormal, overflow, and underflow. An arithmetic operation with a denormal operand will set the denormal exception flag, while an arithmetic operation with any NaN operand or no useful definable result will set the invalid exception flag. An arithmetic operation with a result that that overflows or underflows a destination will set the overflow and underflow exception flags respectively in some examples.

Recent work has also shown that 8-bit float point formats, such as BF8 (using a 1-5-2 format (1-bit sign, 5-bit exponent, and 2-bit fraction or a 1-4-3 format), are a viable option for input data for mixed precision computation such as fused multiply-add (FMA) with BF8 inputs and a FP32 accumulator. To prepare higher-precision outputs to be used as the next operation's inputs, in some embodiments, those outputs need to be converted/rounded to FP8 numbers. Using 8-bit floating-point format instead of single-precision in at least some matrix operations is expected to alleviate memory utilization and bandwidth issues while providing a non-trivial performance upside (e.g., on the order of 2X) even during the compute operation. Additionally, numerical accuracy studies have shown that the precision of the Deep Learning application is not compromised. However, extensive workload studies have shown, that from time to time its required to avoid classic round-to-nearest behavior during these down converts. Instead, a stochastic rounding operation is needed. Examples herein relate to conversion using a provided bias term, including variable in-place, 2nd source merging and/or saturating.

Current experiments show bandwidth issues on the various cache levels and DRAM. So, as matrix compute capabilities speed up significantly (2x), the memory sub-systems capabilities only increase modestly due to reduce memory footprint. However, it has been found important to achieve convergence that FMAs accumulate into single-precision, IEEE float32. That means it may be important down-convert a result to FP8 after the operation completes.

In some examples, BF8-based operations support round to nearest even (RNE) and stochastic rounding. In some examples, HF8-based operations support round to nearest even (RNE) and stochastic rounding. In some examples, hybrid operations using both HF8 and BF8 are supported.

Detailed herein are embodiments of instructions, and their support, that operate on FP8 source data elements. In some embodiments, an execution of a single instruction calculates a square root and in some embodiments an execution of a single instruction calculates a reciprocal square root. In some embodiments, the single instruction is translated from a first instruction set architecture (ISA) to one or more instructions of a second ISA and the execution of the one or more instructions of the second ISA perform those calculations.

In some embodiments, one or both of the instructions are defined such as their execution is to treat denormal inputs or outputs as zeros, support any rounding mode, and/or report or suppress floating point numerical flags.

Figure 2:
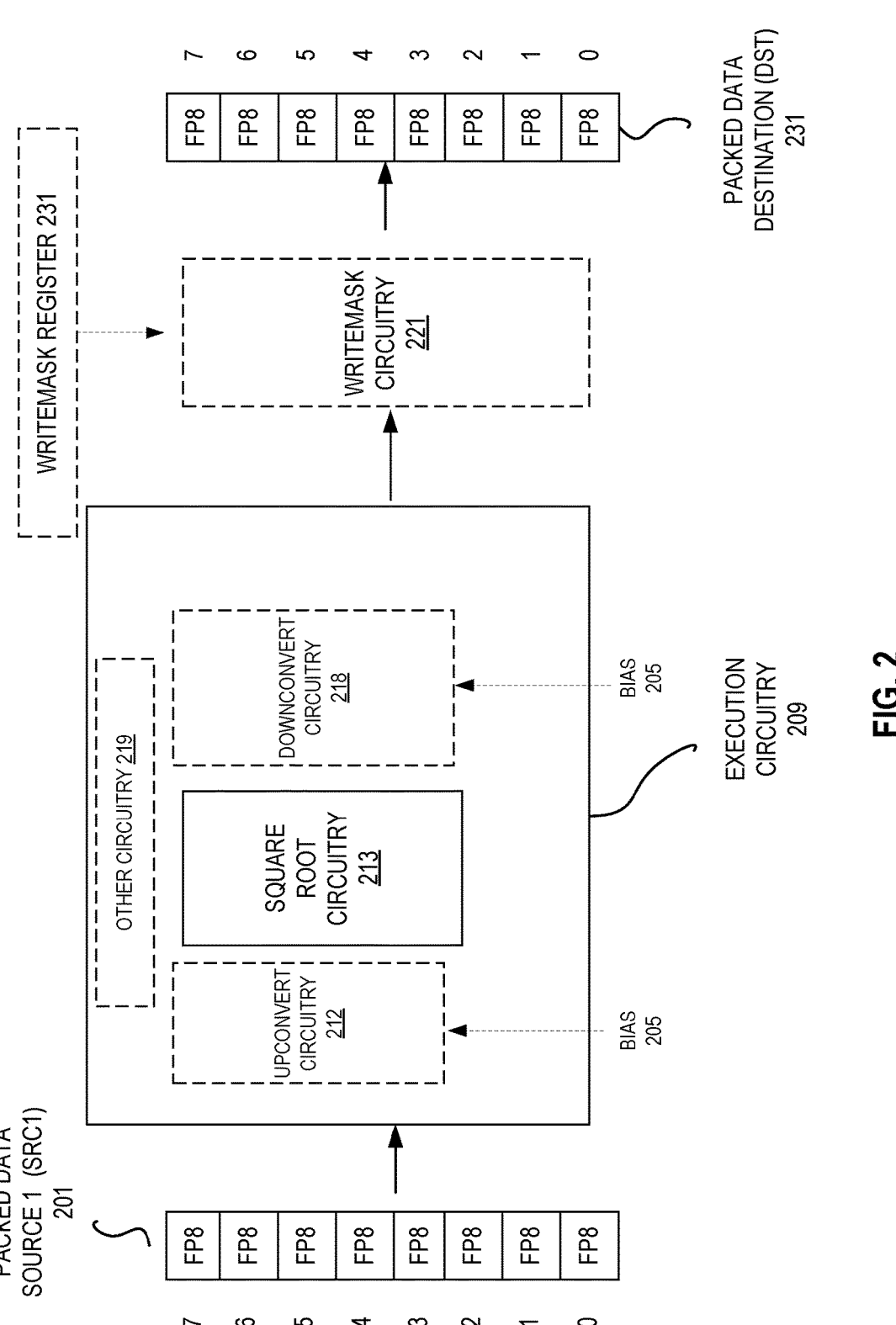
FIG. 2 illustrates an exemplary execution of an instruction to calculate a square root of FP8 data elements.

FIG. 2 illustrates an exemplary execution of an instruction to calculate a square root of FP8 data elements. While this illustration is in little endian format, the principles discussed herein work in big endian format. The square root of FP8 data elements instruction (shown here with an exemplary opcode mnemonic of VSQRTNEPFP8) includes one or more fields to define the opcode for the instruction, one or more fields to reference or indicate a packed data source (e.g., a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

In this example, the packed data source 201 includes 8 packed data elements each of which is in FP8 format. The packed data source 201 may be a register or a memory location.

The packed data source 201 is fed into execution circuitry 209 to be operated on. In particular, execution circuitry 209 performs a calculation of a square root for each of the packed data elements. In this illustration, each of the FP8 data elements from the packed data source 201 has a square root calculated for the by square root circuitry 213. In some embodiments, this execution of the instruction uses a round to nearest (even) rounding mode. In some embodiments, output denormals are always flushed to zero and input denormals are always treated as zero.

In some examples, FP8 values are upconverted using upconvert circuitry 212. In some examples, a (variable or static) bias 205 is applied during the upconversion. In some examples, the upconversion is to FP16. In some examples, the upconversion is to BF16. In some examples, the upconversion is to FP32.

In some examples, the bias 205 is provided by one or more packed data registers (e.g., SIMD or vector) where each data element position of the one or more packed data registers is to provides a bias value for a corresponding data element position of a source and/or destination. In some examples, the bias 205 is provided by one or more general purpose registers where each general purpose register provides a bias to be used for each data element of a particular source and/or destination. Note that in some examples, a single general purpose register is used for a plurality of sources and/or destination.

In some examples, results of the operation are downconvered using downconvert circuitry 218. In some examples, a bias (variable or static) 205 is applied during the downconversion. In some examples, the downconversion is from FP16. In some examples, the downconversion is from BF16. In some examples, the downconversion is from FP32. In other examples, when FP8 is natively supported, no downconversion is performed.

In some examples, the execution circuitry 209 is configured according to control information to use one or more of the described components instead of other execution circuits 219. The control information may be provided by a decoder, scheduler, etc.

A packed data destination 231 is written to store the resultant FP8-formatted square roots in corresponding packed data elements as the packed data source 201. In some embodiments, when the instruction calls for the use of predication or writemasking, a writemask (or predicate) register 231 dictates how the resultant FP8-formatted square roots are stored and/or zeroed using the writemask circuitry 221.

Figure 3:
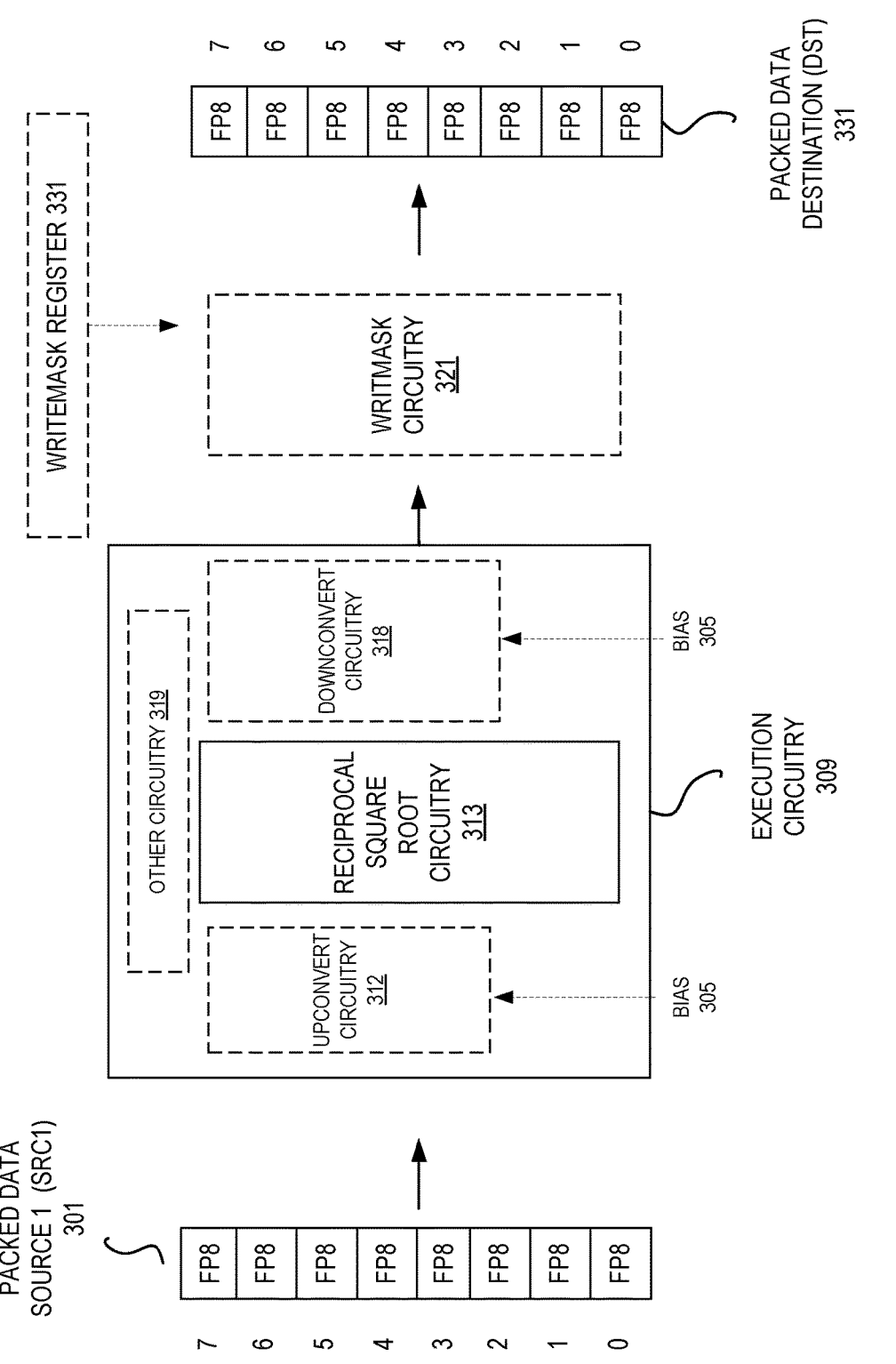
FIG. 3 illustrates an exemplary execution of an instruction to calculate a reciprocal square root of FP8 data elements.

FIG. 3 illustrates an exemplary execution of an instruction to calculate a reciprocal square root of FP8 data elements. While this illustration is in little endian format, the principles discussed herein work in big endian format. The reciprocal square root of FP8 data elements instruction (shown here with an exemplary opcode mnemonic of VSQRTNEPFP8) includes one or more fields to define the opcode for the instruction, one or more fields to reference or indicate a packed data source (e.g., a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

In this example, the packed data source 301 includes 8 packed data elements each of which is in FP8 format. The packed data source 301 may be a register or a memory location.

The packed data source 301 is fed into execution circuitry 309 to be operated on. In particular, execution circuitry 309 performs a calculation of a reciprocal square root for each of the packed data elements. In this illustration, each of the FP8 data elements has a reciprocal square root calculated by reciprocal square root circuitry 313. In some embodiments, this execution of the instruction uses a round to nearest (even) rounding mode. In some embodiments, output denormals are always flushed to zero and input denormals are always treated as zero.

In some examples, FP8 values are upconverted using upconvert circuitry 212. In some examples, a (variable or static) bias 205 is applied during the upconversion. In some examples, the upconversion is to FP16. In some examples, the upconversion is to BF16. In some examples, the upconversion is to FP32.

In some examples, the bias 205 is provided by one or more packed data registers (e.g., SIM D or vector) where each data element position of the one or more packed data registers is to provides a bias value for a corresponding data element position of a source and/or destination. In some examples, the bias 205 is provided by one or more general purpose registers where each general purpose register provides a bias to be used for each data element of a particular source and/or destination. Note that in some examples, a single general purpose register is used for a plurality of sources and/or destination.

In some examples, results of the operation are downconvered using downconvert circuitry 318. In some examples, a bias (variable or static) 305 is applied during the downconversion. In some examples, the downconversion is from FP16. In some examples, the downconversion is from BF16. In some examples, the downconversion is from FP32. In other examples, when FP8 is natively supported, no downconversion is performed.

In some examples, the execution circuitry 309 is configured according to control information to use one or more of the described components instead of other execution circuits 319. The control information may be provided by a decoder, scheduler, etc.

A packed data destination 331 is written to store the resultant FP8-formatted reciprocal square roots in corresponding packed data elements as the packed data source 301. In some embodiments, when the instruction calls for the use of predication or writemasking, a writemask (or predicate) register 331 dictates how the resultant FP8-formatted reciprocal square roots are stored and/or zeroed using the writemask circuitry 321.

Figure 4:
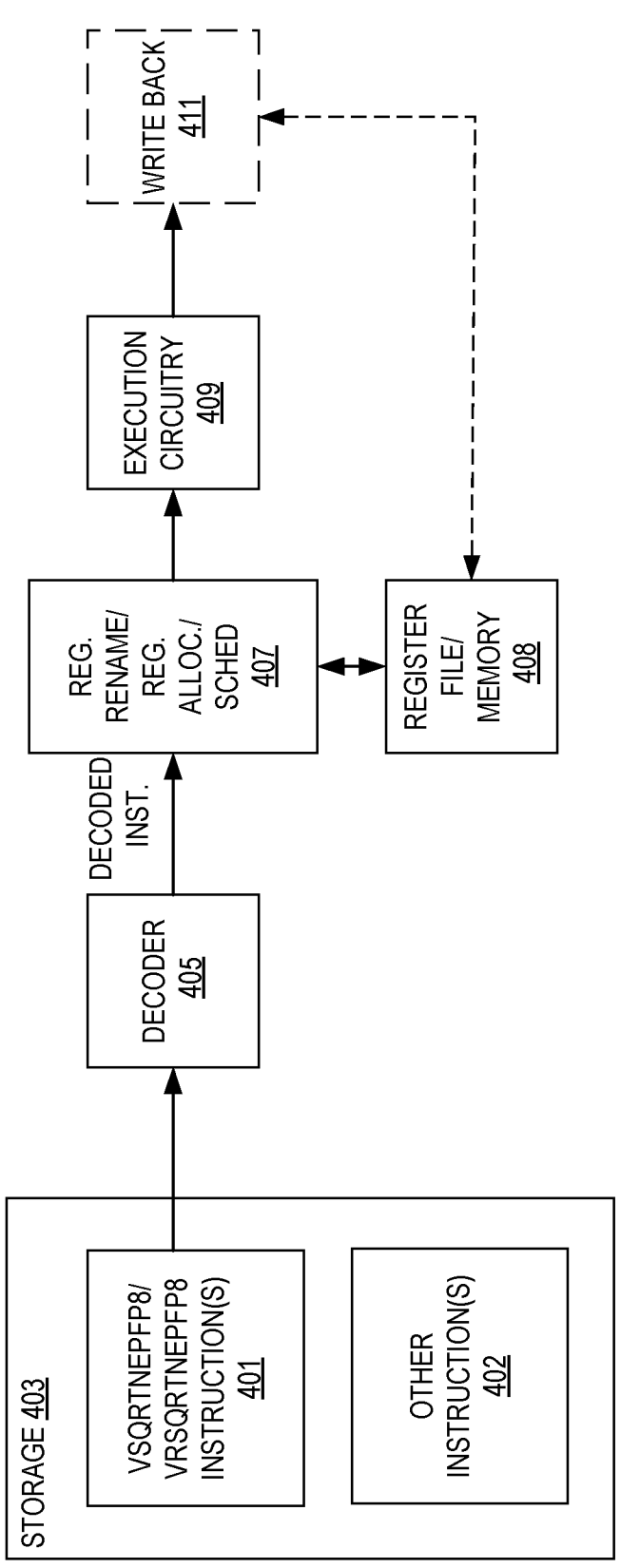
FIG. 4 illustrates embodiments of hardware to process an instruction such as the VSQRTNEPFP8 and/or VRSQRT-NEPFP8 instructions.

FIG. 4 illustrates embodiments of hardware to process an instruction such as the VSQRTNEPFP8 and/or VRSQRTNEPFP8 instructions. As illustrated, storage 403 stores a VSQRTNEPFP8 and/or VRSQRTNEPFP8 instruction 401 to be executed. Other instructions 402 may also be stored.

The instruction 401 is received by decode circuitry 405. For example, the decode circuitry 405 receives this instruction from fetch logic/circuitry. The instruction includes fields for an opcode, first sources, and a destination. In some embodiments, the source and destination are registers, and in other embodiments one or more are memory locations.

More detailed embodiments of at least one instruction format will be detailed later. The decode circuitry 405 decodes the instruction into one or more operations. In some embodiments, this decoding includes generating a plurality of micro-operations to be performed by execution circuitry (such as execution circuitry 409). The decode circuitry 405 also decodes instruction prefixes.

In some embodiments, register renaming, register allocation, and/or scheduling circuitry 407 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 408 store data as operands of the instruction to be operated on by execution circuitry 409. Exemplary register types include packed data registers, general purpose registers, and floating-point registers.

Execution circuitry 409 executes the decoded instruction. Exemplary detailed execution circuitry is shown in FIGS. 2, 11, etc. The execution of the decoded instruction causes the execution circuitry to either a calculation of a square root of FP8 data elements or a calculation of a reciprocal square root of FP8 data elements of the source operand and stores the result in a destination register or memory location. In some examples, the data elements are upscaled (e.g., to BF16, FP16, FP32, etc.) prior to the operation and/or downscaled after the operation and prior to storage. Note upscaling, etc. may use a variable bias.

In some embodiments, retirement/write back circuitry 411 architecturally commits the result 408 and retires the instruction.

An embodiment of a format for a calculate a square root of FP8 data elements instruction is VSQRTNEPFP8 DST{k}, SRC. In some embodiments, VSQRTNEPFP8 is the opcode mnemonic of the instruction. DST is a field for the destination operand identifier, such as packed data register or memory. SRC is one or more fields for the source operands identifier, such as a packed data register and/or memory. In some examples, the opcode is provided by at least field 1403, DST field is provided by field 1544, the source is provided by bits VVVV of one of 1805, BPJ17, or 1917, or the source is provided by at least 1546. In some examples, the opcode is provided by at least field 1403, DST field is provided by at least field 1544, the source is provided by bits VVVV of one of 1805, BPJ17, or 1917, or the source is a memory location provided by at least 1546 and/or the SIB byte 1504. The source operand and destination operand may come in one or more sizes such as 128-bit, 256-bit, 512-bit, etc. The {k} is used when writemasking or predication is used.

An embodiment of a format for a calculate a reciprocal square root of FP8 data elements instruction is VRSQRTNEPFP8 DST{k}, SRC. In some embodiments, VRSQRTNEPFP8 is the opcode mnemonic of the instruction. DST is a field for the destination operand identifier, such as packed data register or memory. SRC is one or more fields for the source operands identifier, such as a packed data register and/or memory. In some examples, the opcode is provided by at least field 1403, DST field is provided by field 1544, the source is provided by bits VVVV of one of 1805, BPJ17, or 1917, or the source is provided by at least 1546. In some examples, the opcode is provided by at least field 1403, DST field is provided by at least field 1544, the source is provided by bits VVVV of one of 1805, BPJ17, or 1917, or the source is a memory location provided by at least 1546 and/or the SIB byte 1504. The source operand and destination operand may come in one or more sizes such as 128-bit, 256-bit, 512-bit, etc. The {k} is used when writemasking or predication is used.

FIG. 5 illustrates an embodiment of method performed by a processor to process a calculate a square root of FP8 data elements instruction. For example, a processor core as shown in FIG. 11(B), a pipeline as detailed below, etc. performs this method.

At 501 an instruction is fetched having fields for an opcode, an identification of a location of a packed data source operand, and an identification of a packed data destination operand, wherein the opcode is to indicate that execution circuitry is to perform, for each data element position of the packed data source operand, a square root of a FP8 data element in that position and store a result of each square root into a corresponding data element position of the packed data destination operand.

In some embodiments, the fetched instruction, of a first ISA, is translated into one or more instructions of a second, different ISA at 503. The one or more instructions of the second, different ISA, when executed, provided the same result as if the fetched instruction had been executed. Note the translation may be performed by hardware, software, or a combination thereof.

The instruction (or the translated one or more instructions) is/are decoded 505. This decoding may cause the generation of one or more micro-operations to be performed. Note that as this instruction Data values associated with the source operand of the decoded instruction are retrieved at 507. For example, when a source operand is stored in memory, the data from the indicated memory location is retrieved.

At 509, the decoded instruction(s) is/are executed by execution circuitry (hardware) such as that detailed herein. The execution circuitry is to perform for each data element position of the packed data source operand, a square root of a FP8 data element in that position and store a result of each square root into a corresponding data element position of the packed data destination operand. No conversion is required and native FP8 square root circuitry is used in some examples. In some examples, the data elements are upscaled (e.g., to BF16, FP16, FP32, etc.) prior to the operation and/or downscaled after the operation and prior to storage. Note upscaling, etc. may use a variable bias.

In some embodiments, the instruction is committed or retired at 511.

FIGS. 6(A)-(B) illustrate examples of pseudocode representing the execution and format of a square root of FP8 data elements instruction. Note that EVEX.b maps to the b of prefix 1401(C). The comment of DAZ, FTZ, RNE, and SAE refer to the use of support for flush-to-zero (FTZ), denormals-are-zero (DAZ), suppress all exceptions (SAE), and round-to-even (RNE) rounding.

FIG. 7 illustrates an embodiment of method performed by a processor to process a calculate a reciprocal square root of FP8 data elements instruction. For example, a processor core as shown in FIG. 11(B), a pipeline as detailed below, etc. performs this method.

At 701 an instruction is fetched having fields for an opcode, an identification of a location of a packed data source operand, and an identification of a packed data destination operand, wherein the opcode is to indicate that execution circuitry is to perform, for each data element position of the packed data source operand, a reciprocal square root of a FP8 data element in that position and store a result of each reciprocal square root into a corresponding data element position of the packed data destination operand.

In some embodiments, the fetched instruction, of a first ISA, is translated into one or more instructions of a second, different ISA at 703. The one or more instructions of the second, different ISA, when executed, provided the same result as if the fetched instruction had been executed. Note the translation may be performed by hardware, software, or a combination thereof.

The instruction (or the translated one or more instructions) is/are decoded 705. This decoding may cause the generation of one or more micro-operations to be performed. Note that as this instruction Data values associated with the source operand of the decoded instruction are retrieved at 707. For example, when a source operand is stored in memory, the data from the indicated memory location is retrieved.

At 709, the decoded instruction(s) is/are executed by execution circuitry (hardware) such as that detailed herein. The execution circuitry is to perform for each data element position of the packed data source operand, a reciprocal square root of a FP8 data element in that position and store a result of each reciprocal square root into a corresponding data element position of the packed data destination operand. No conversion is required and native FP8 reciprocal square root circuitry is used in some examples. In some examples, the data elements are upscaled (e.g., to BF16, FP16, FP32, etc.) prior to the operation and/or downscaled after the operation and prior to storage. Note upscaling, etc. may use a variable bias.

In some embodiments, the instruction is committed or retired at 711.

FIGS. 8(A)-(B) illustrate examples of pseudocode representing the execution and format of a reciprocal square root of FP8 data elements instruction. Note that EVEX.b maps to the b of prefix 1401(C). The comment of DAZ, FTZ, RNE, and SAE refers to the use of support for flush-to-zero (FTZ), denormals-are-zero (DAZ), suppress all exceptions (SAE), and round-to-even (RNE) rounding.

As noted above, in some examples FP8 data elements are upscaled by upconversion circuitry and/or 16-bit or 32-bit data elements downscaled by downconversion circuitry. Detailed below are example pseudocode representing acts the conversion circuitries perform. In some examples, this pseudocode is usable to create such circuitry (other pseudocode also be used to create circuitry such as aspects of execution circuitry in some examples). In the code below, the input is a data element, an indication of the FP8 type, a bias, and an indication of NaN handling. Note that this is merely illustrative and some aspects may not be included (for example, the BF8 or HF8 may be indicated by the helper function itself). Note that use of variants of convert (e.g., CVT, UPSCALE), DOWNSCALE may be used in other places. For example, in some of the pseudocode the helper function is merely UPSCALE or DOWNSCALE and one or more of the helper functions below may be used in its place including the use of a bias.

The instructions detailed above may be used in a variety of computer architectures and environments, utilize one or more instruction formats, etc. Examples of architectures, formats, etc. that support these instructions are detailed below.

Example Computer Architectures

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 9:
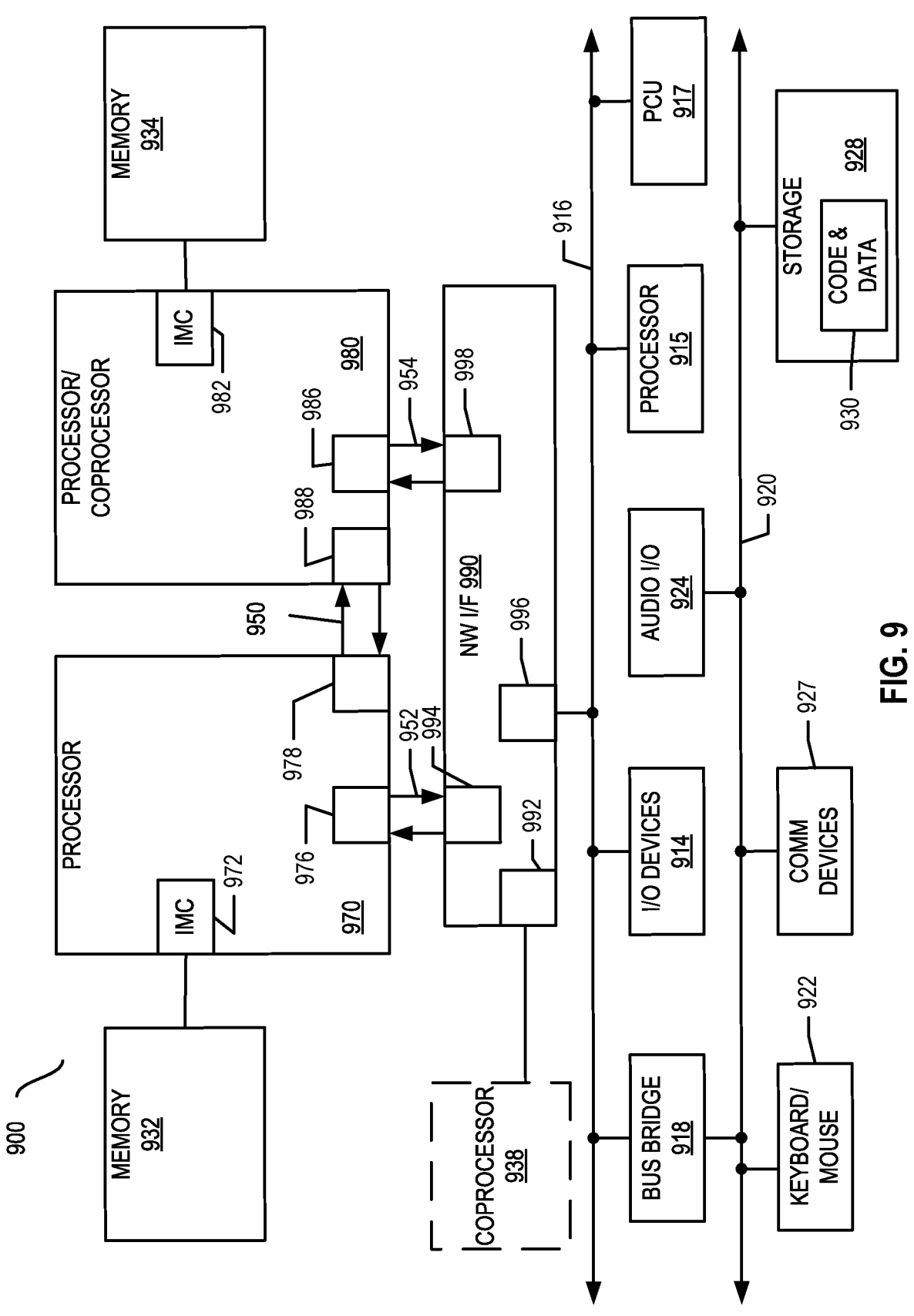
FIG. 9 illustrates an example computing system.

FIG. 9 illustrates an example computing system. Multiprocessor system 900 is an interfaced system and includes a plurality of processors or cores including a first processor 970 and a second processor 980 coupled via an interface 950 such as a point-to-point (P-P) interconnect, a fabric, and/or bus. In some examples, the first processor 970 and the second processor 980 are homogeneous. In some examples, first processor 970 and the second processor 980 are heterogenous. Though the example system 900 is shown to have two processors, the system may have three or more processors, or may be a single processor system. In some examples, the computing system is a system on a chip (SoC).

Processors 970 and 980 are shown including integrated memory controller (IMC) circuitry 972 and 982, respectively. Processor 970 also includes interface circuits 976 and 978; similarly, second processor 980 includes interface circuits 986 and 988. Processors 970, 980 may exchange information via the interface 950 using interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a network interface (NW I/F) 990 via individual interfaces 952, 954 using interface circuits 976, 994, 986, 998. The network interface 990 (e.g., one or more of an interconnect, bus, and/or fabric, and in some examples is a chipset) may optionally exchange information with a coprocessor 938 via an interface circuit 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via an interface such as P-P interconnect, such that either or both processors' local cache information may be stored in the shared cache if a processor is placed into a low power mode.

Network interface 990 may be coupled to a first interface 916 via interface circuit 996. In some examples, first interface 916 may be an interface such as a Peripheral Component Interconnect (PCI) interconnect, a PCI Express interconnect or another I/O interconnect. In some examples, first interface 916 is coupled to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interface 916, along with a bus bridge 918 which couples first interface 916 to a second interface 920. In some examples, one or more additional processor(s) 915, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 916. In some examples, second interface 920 may be a low pin count (LPC) interface. Various devices may be coupled to second interface 920 including, for example, a keyboard and/or mouse 922, communication devices 927 and storage circuitry 928. Storage circuitry 928 may be one or more non-transitory machine-readable storage media as described below, such as a disk drive or other mass storage device which may include instructions/code and data 930 and may implement the storage 'ISAB03 in some examples. Further, an audio I/O 924 may be coupled to second interface 920. Note that other architectures than the point-to-point architecture described above are possible. For example, instead of the point-to-point architecture, a system such as multiprocessor system 900 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality.

Example core architectures are described next, followed by descriptions of example processors and computer architectures.

Figure 10:
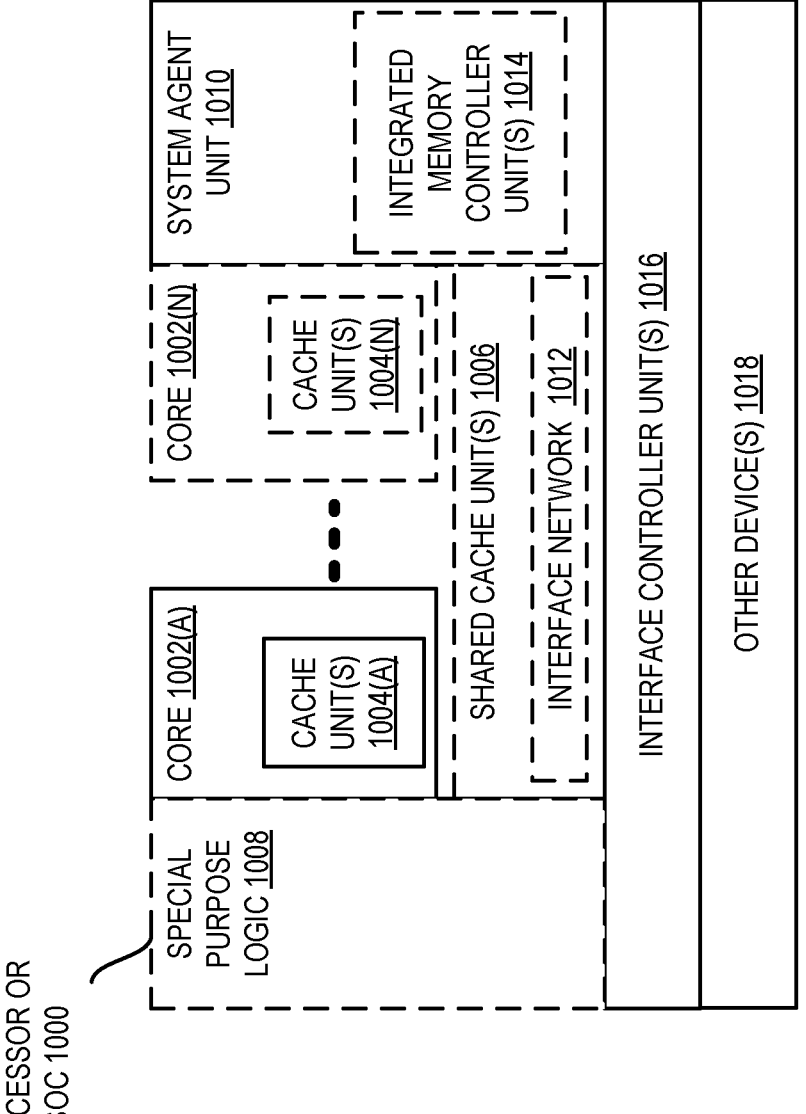
FIG. 10 illustrates a block diagram of an example processor and/or System on a Chip (SoC) that may have one or more cores and an integrated memory controller.

FIG. 10 illustrates a block diagram of an example processor and/or SoC 1000 that may have one or more cores and an integrated memory controller. The solid lined boxes illustrate a processor 1000 with a single core 1002(A), system agent unit circuitry 1010, and a set of one or more interface controller unit(s) circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interface controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004(A)-(N) within the cores 1002(A)-(N), a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples interface network circuitry 1012 (e.g., a ring interconnect) interfaces the special purpose logic 1008 (e.g., integrated graphics logic), the set of shared cache unit(s) circuitry 1006, and the system agent unit circuitry 1010, alternative examples use any number of well-known techniques for interfacing such units. In some examples, coherency is maintained between one or more of the shared cache unit(s) circuitry 1006 and cores 1002(A)-(N). In some examples, interface controller units circuitry 1016 couple the cores 1002 to one or more other devices 1018 such as one or more I/O devices, storage, one or more communication devices (e.g., wireless networking, wired networking, etc.), etc.

In some examples, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous in terms of instruction set architecture (ISA). Alternatively, the cores 1002(A)-(N) may be heterogeneous in terms of ISA; that is, a subset of the cores 1002(A)-(N) may be capable of executing an ISA, while other cores may be capable of executing only a subset of that ISA or another ISA.

Example Core Architectures—in-Order and Out-of-Order Core Block Diagram

Figure 11A:
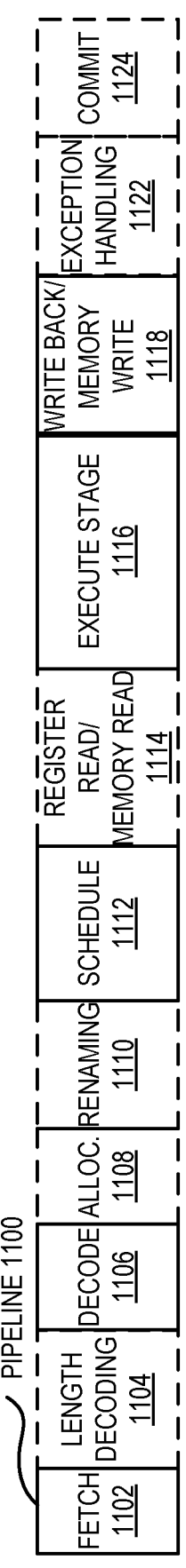
FIG. 11(A) is a block diagram illustrating both an example in-order pipeline and an example register renaming, out-of-order issue/execution pipeline according to examples.
Figure 11B:
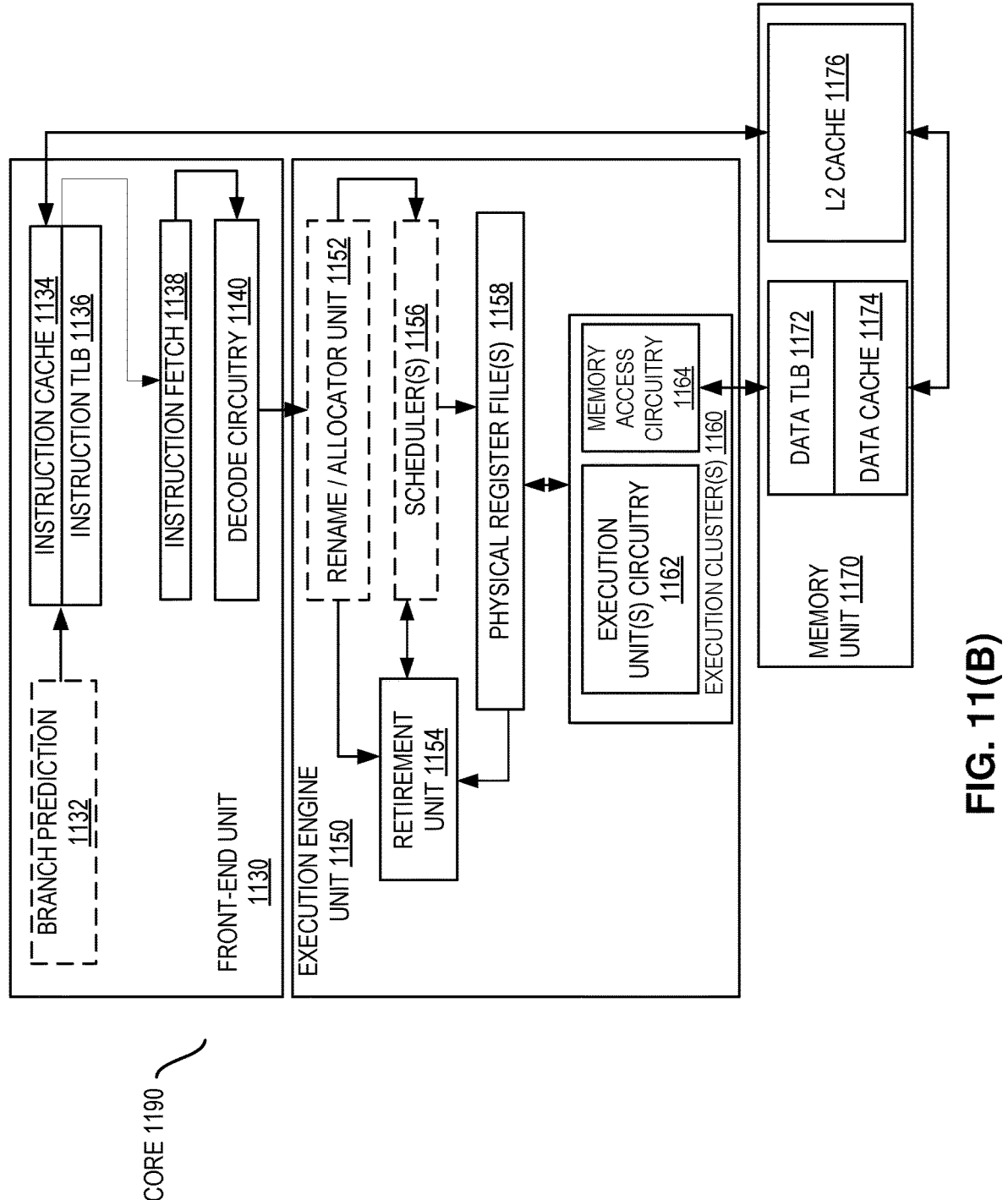
FIG. 11(B) is a block diagram illustrating both an example in-order architecture core and an example register renaming, out-of-order issue/execution architecture core to be included in a processor according to examples.

FIG. 11(A) is a block diagram illustrating both an example in-order pipeline and an example register renaming, out-of-order issue/execution pipeline according to examples. FIG. 11(B) is a block diagram illustrating both an example in-order architecture core and an example register renaming, out-of-order issue/execution architecture core to be included in a processor according to examples. The solid lined boxes in FIGS. 11(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11(A), a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, and during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 11(B) may implement the pipeline 1100 as follows: 1) the instruction fetch circuitry 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11(B) shows a processor core 1190 including front-end unit circuitry 1130 coupled to execution engine unit circuitry 1150, and both are coupled to memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front-end unit circuitry 1130 may include branch prediction circuitry 1132 coupled to instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front-end circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, address generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, writemask registers unit circuitry, and scalar register unit circuitry. These register units may provide architectural vector registers, vector mask registers, general-purpose registers, etc. The physical register file(s) circuitry 1158 is coupled to the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to data cache circuitry 1174 coupled to level 2 (L2) cache circuitry 1176. In one example, the memory access circuitry 1164 may include load unit circuitry, store address unit circuitry, and store data unit circuitry, each of which is coupled to the data TLB circuitry 1172 in the memory unit circuitry 1170. The instruction cache circuitry 1134 is further coupled to the level 2 (L2) cache circuitry 1176 in the memory unit circuitry 1170. In one example, the instruction cache 1134 and the data cache 1174 are combined into a single instruction and data cache (not shown) in L2 cache circuitry 1176, level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Example Execution Unit(s) Circuitry

Figure 12:
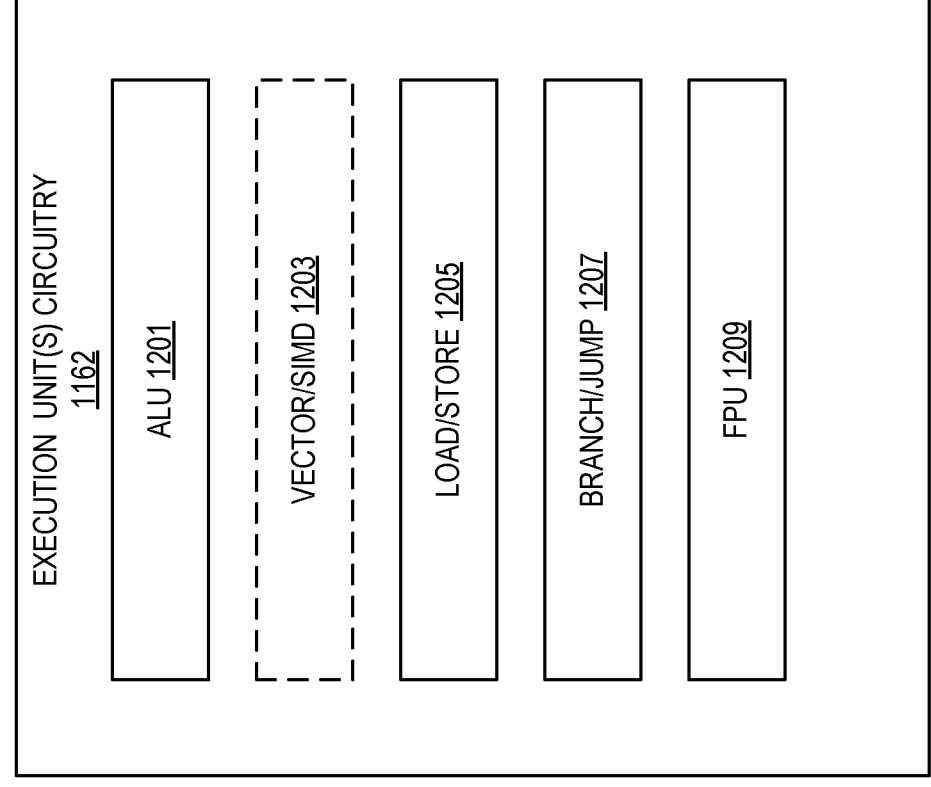
FIG. 12 illustrates examples of execution unit(s) circuitry.

FIG. 12 illustrates examples of execution unit(s) circuitry, such as execution unit(s) circuitry 1162 of FIG. 11(B). As illustrated, execution unit(s) circuitry 1162 may include one or more ALU circuits 1201, optional vector/single instruction multiple data (SIMD) circuits 1203, load/store circuits 1205, branch/jump circuits 1207, and/or Floating-point unit (FPU) circuits 1209. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. FPU circuits 1209 perform floating-point arithmetic. The width of the execution unit(s) circuitry 1162 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture

FIG. 13 is a block diagram of a register architecture 1300 according to some examples. As illustrated, the register architecture 1300 includes vector/SIM D registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register file 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Model specific registers or machine specific registers (MSRs) 1335 control and report on processor performance. Most MSRs 1335 handle system-related functions and are not accessible to an application program. For example, MSRs may provide control for one or more of: performance-monitoring counters, debug extensions, memory type range registers, thermal and power management, instruction-specific support, and/or processor feature/mode support. Machine check registers 1360 consist of control, status, and error reporting MSRs that are used to detect and report on hardware errors. Control register(s) 1355 (e.g., CR0-CR4) determine the operating mode of a processor (e.g., processor 970, 980, 938, 915, and/or 1000) and the characteristics of a currently executing task. In some examples, MSRs 1335 are a subset of control registers 1355.

One or more instruction pointer register(s) 1330 store an instruction pointer value. Debug registers 1350 control and allow for the monitoring of a processor or core's debugging operations.

Memory (mem) management registers 1365 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1300 may, for example, be used in register file/memory 'ISAB08, or physical register file(s) circuitry 11 58. Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 14:
FIG. 14 illustrates examples of an instruction format.

FIG. 14 illustrates examples of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate value 1409. Note that some instructions utilize some or all the fields of the format whereas others may only use the field for the opcode 1403. In some examples, the order illustrated is the order in which these fields are to be encoded, however, it should be appreciated that in other examples these fields may be encoded in a different order, combined, etc.

The prefix(es) field(s) 1401, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some examples, a primary opcode encoded in the opcode field 1403 is one, two, or three bytes in length. In other examples, a primary opcode can be a different length. An additional 3-bit opcode field is sometimes encoded in another field.

Figure 15:
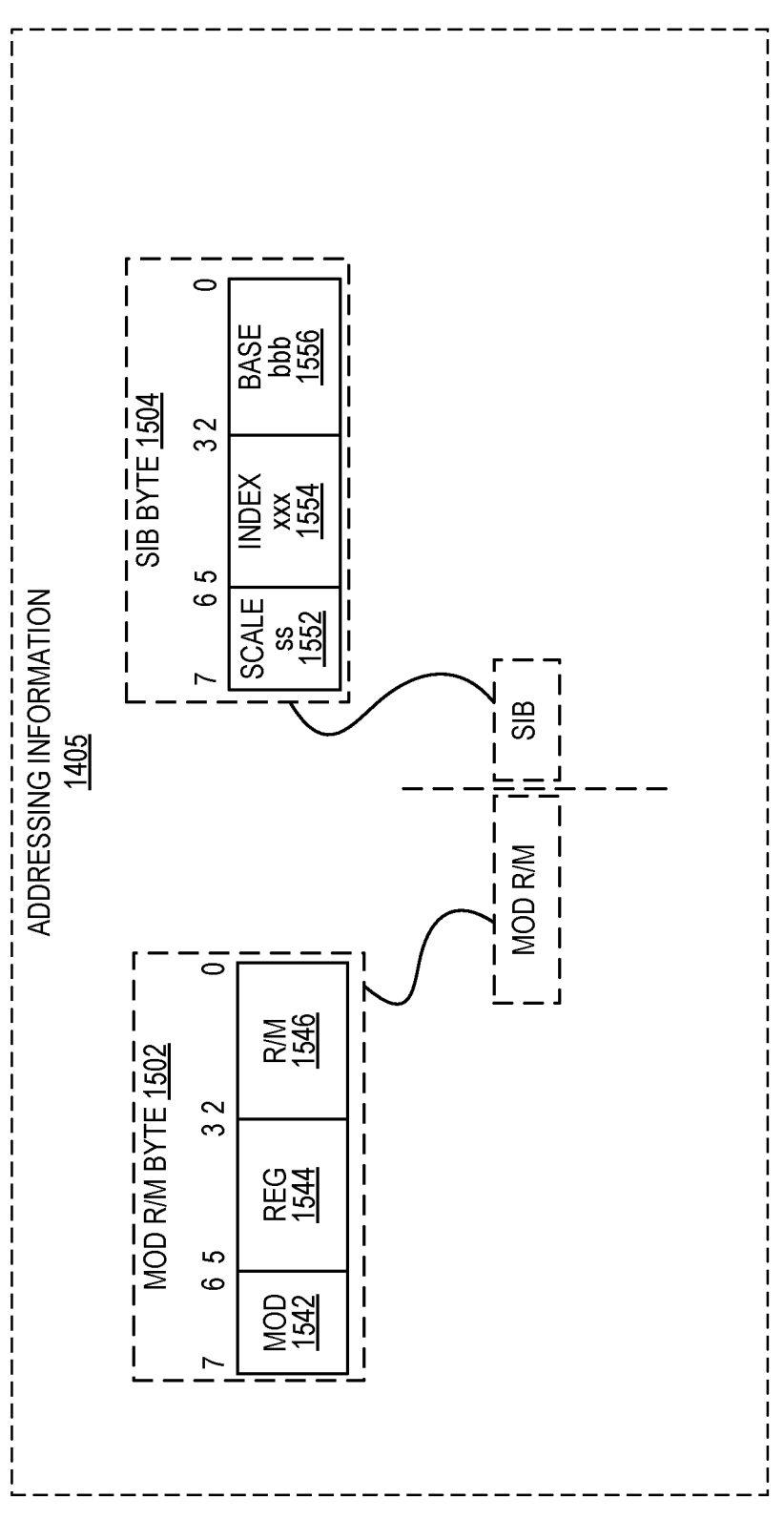
FIG. 15 illustrates examples of an addressing information field.

The addressing information field 1405 is used to address one or more operands of the instruction, such as a location in memory or one or more registers. FIG. 15 illustrates examples of the addressing information field 1405. In this illustration, an optional MOD R/M byte 1502 and an optional Scale, Index, Base (SIB) byte 1504 are shown. The MOD R/M byte 1502 and the SIB byte 1504 are used to encode up to two operands of an instruction, each of which is a direct register or effective memory address. Note that both of these fields are optional in that not all instructions include one or more of these fields. The MOD R/M byte 1502 includes a MOD field 1542, a register (reg) field 1544, and R/M field 1546.

The content of the MOD field 1542 distinguishes between memory access and non-memory access modes. In some examples, when the MOD field 1542 has a binary value of 11 (11b), a register-direct addressing mode is utilized, and otherwise a register-indirect addressing mode is used.

The register field 1544 may encode either the destination register operand or a source register operand or may encode an opcode extension and not be used to encode any instruction operand. The content of register field 1544, directly or through address generation, specifies the locations of a source or destination operand (either in a register or in memory). In some examples, the register field 1544 is supplemented with an additional bit from a prefix (e.g., prefix 1401) to allow for greater addressing.

The R/M field 1546 may be used to encode an instruction operand that references a memory address or may be used to encode either the destination register operand or a source register operand. Note the R/M field 1546 may be combined with the MOD field 1542 to dictate an addressing mode in some examples.

The SIB byte 1504 includes a scale field 1552, an index field 1554, and a base field 1556 to be used in the generation of an address. The scale field 1552 indicates a scaling factor. The index field 1554 specifies an index register to use. In some examples, the index field 1554 is supplemented with an additional bit from a prefix (e.g., prefix 1401) to allow for greater addressing. The base field 1556 specifies a base register to use. In some examples, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some examples, the displacement field 1407 provides this value. Additionally, in some examples, a displacement factor usage is encoded in the MOD field of the addressing information field 1405 that indicates a compressed displacement scheme for which a displacement value is calculated and stored in the displacement field 1407.

In some examples, the immediate value field 1409 specifies an immediate value for the instruction. An immediate value may be encoded as a 1-byte value, a 2-byte value, a 4-byte value, etc.

Figures 16, 17A, 17B, 17C, 17D:
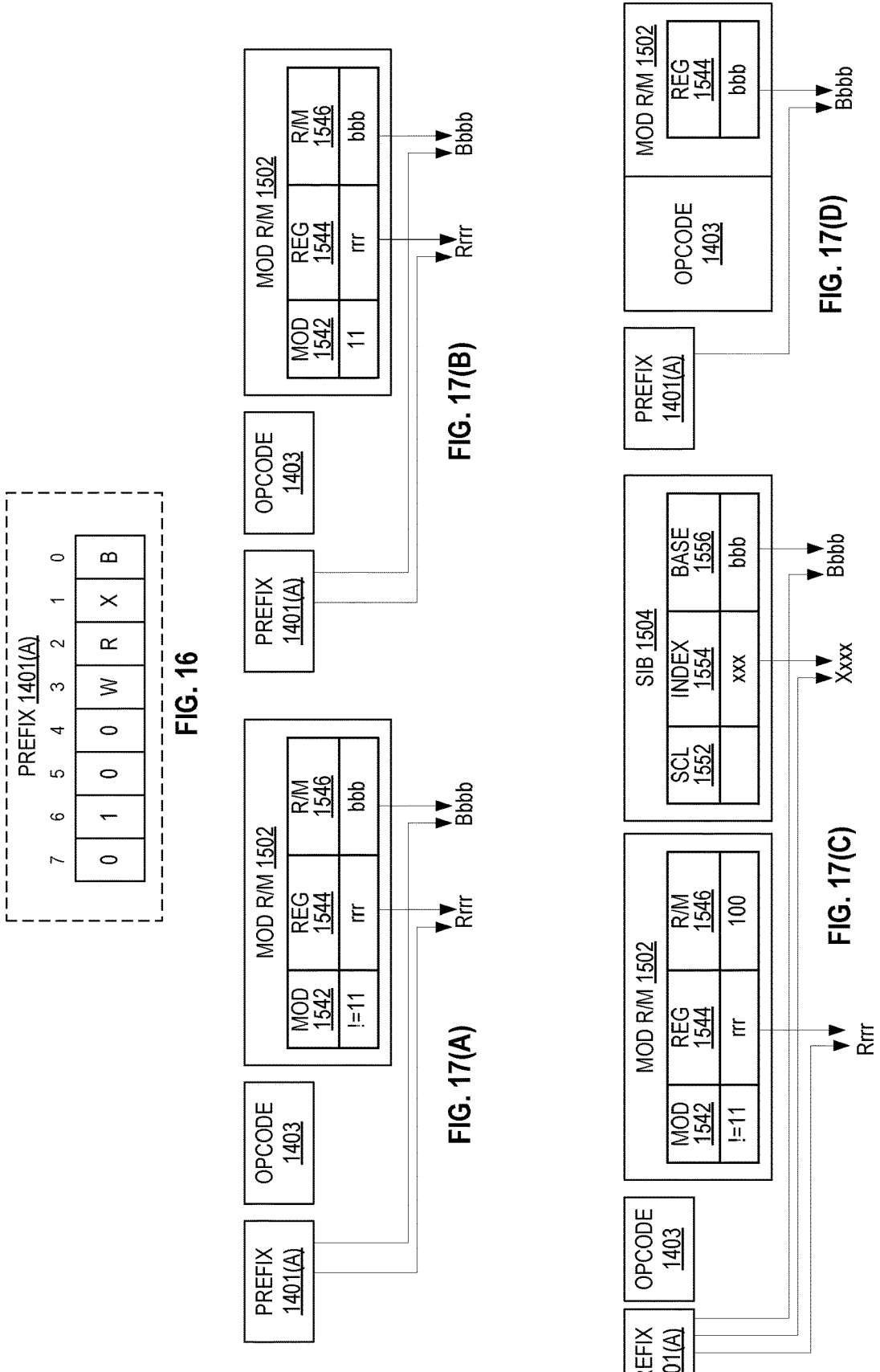
FIG. 16 illustrates examples of a first prefix.
FIGS. 17(A)-(D) illustrate examples of how the R, X, and B fields of the first prefix in FIG. 16 are used.

FIG. 16 illustrates examples of a first prefix 1401(A). In some examples, the first prefix 1401(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1401(A) may specify up to three registers using 3-bit fields depending on the format:

1) using the reg field 1544 and the R/M field 1546 of the MOD R/M byte 1502; 2) using the MOD R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1401(A), bit position 2 (R) may be an extension of the MOD R/M reg field 1544 and may be used to modify the MOD R/M reg field 1544 when that field encodes a general-purpose register, a 64-bit packed data register (e.g., a SSE register), or a control or debug register. R is ignored when MOD R/M byte 1502 specifies other registers or defines an extended opcode.

Bit position 1 (X) may modify the SIB byte index field 1554.

Bit position 0 (B) may modify the base in the MOD R/M R/M field 1546 or the SIB byte base field 1556; or it may modify the opcode register field used for accessing general purpose registers (e.g., general purpose registers 1325).

FIGS. 17(A)-(D) illustrate examples of how the R, X, and B fields of the first prefix 1401(A) are used. FIG. 17(A) illustrates R and B from the first prefix 1401(A) being used to extend the reg field 1544 and R/M field 1546 of the MOD R/M byte 1502 when the SIB byte 1504 is not used for memory addressing. FIG. 17(B) illustrates R and B from the first prefix 1401(A) being used to extend the reg field 1544 and R/M field 1546 of the MOD R/M byte 1502 when the SIB byte 1504 is not used (register-register addressing). FIG. 17(C) illustrates R, X, and B from the first prefix 1401(A) being used to extend the reg field 1544 of the MOD R/M byte 1502 and the index field 1554 and base field 1556 when the SIB byte 1504 being used for memory addressing. FIG. 17(D) illustrates B from the first prefix 1401(A) being used to extend the reg field 1544 of the MOD R/M byte 1502 when a register is encoded in the opcode 1403.

Figures 18A, 18B:
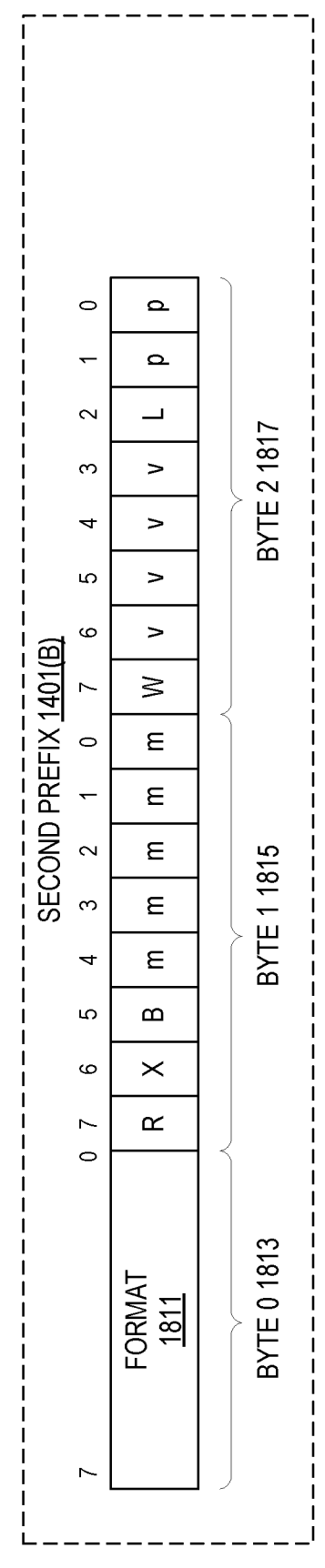
FIGS. 18(A)-(B) illustrate examples of a second prefix.

FIGS. 18(A)-(B) illustrate examples of a second prefix 1401(B). In some examples, the second prefix 1401(B) is an example of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some examples, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18(A) illustrates examples of a two-byte form of the second prefix 1401(B). In one example, a format field 1801 (byte 0 1803) contains the value CSH. In one example, byte 1 1805 includes an "R" value in bit[7]. This value is the complement of the "R" value of the first prefix 1401(A).

Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1546 to encode the instruction operand that references a memory address or encode either the destination register operand or a source register operand.

Instructions that use this prefix may use the MOD R/M reg field 1544 to encode either the destination register operand or a source register operand, or to be treated as an opcode extension and not used to encode any instruction operand.

For instruction syntax that support four operands, vvvv, the MOD R/M R/M field 1546 and the MOD R/M reg field 1544 encode three of the four operands. Bits[7:4] of the immediate value field 1409 are then used to encode the third source register operand.

FIG. 18(B) illustrates examples of a three-byte form of the second prefix 1401(B). In one example, a format field 1811 (byte 0 1813) contains the value C4H. Byte 1 1815 includes in bits[7:5] "R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1546 to encode the instruction operand that references a memory address or encode either the destination register operand or a source register operand.

Instructions that use this prefix may use the MOD R/M reg field 1544 to encode either the destination register operand or a source register operand, or to be treated as an opcode extension and not used to encode any instruction operand.

For instruction syntax that support four operands, vvvv, the MOD R/M R/M field 1546, and the MOD R/M reg field 1544 encode three of the four operands. Bits[7:4] of the immediate value field 1409 are then used to encode the third source register operand.

Figure 19:
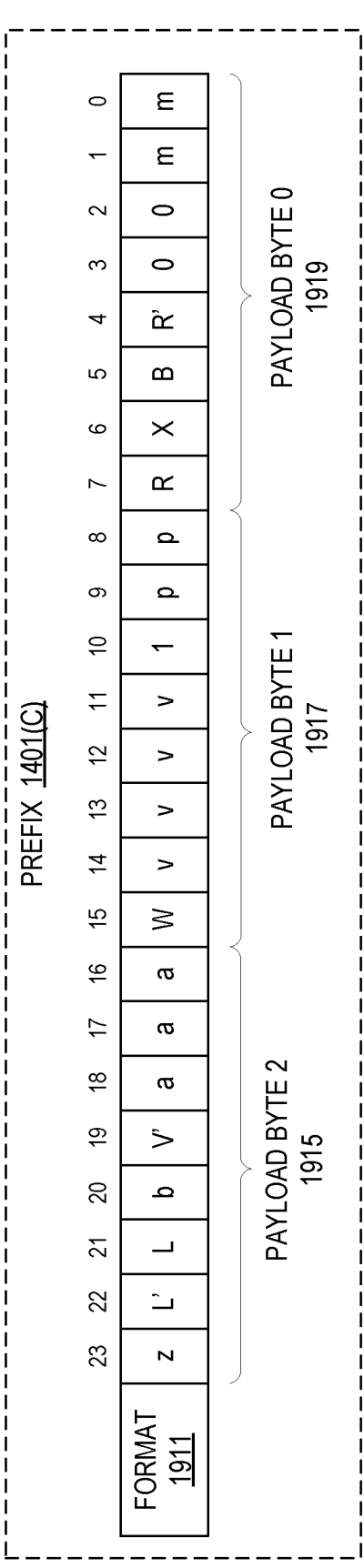
FIG. 19 illustrates examples of a third prefix.

FIG. 19 illustrates examples of a third prefix 1401(C). In some examples, the third prefix 1401(C) is an example of an EVEX prefix. The third prefix 1401(C) is a four-byte prefix.

The third prefix 1401(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some examples, P[1:0] of payload byte 1919 are identical to the low two mm bits. P[3:2] are reserved in some examples. Bit P[4] (R') allows access to the high 16 vector register set when combined with P[7] and the MOD R/M reg field 1544. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1544 and MOD R/M R/M field 1546. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1411(B) and may serve as an opcode extension bit or operand size promotion.

P[18:16] specify the index of a register in the opmask (writemask) registers (e.g., writemask/predicate registers 1315). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1401(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | 2nd Source or Destination |
| RM | MOD R/M R/M | GPR, Vector | 1st Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | 2nd Source |
| RM | MOD R/M R/M | k0-k7 | 1st Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
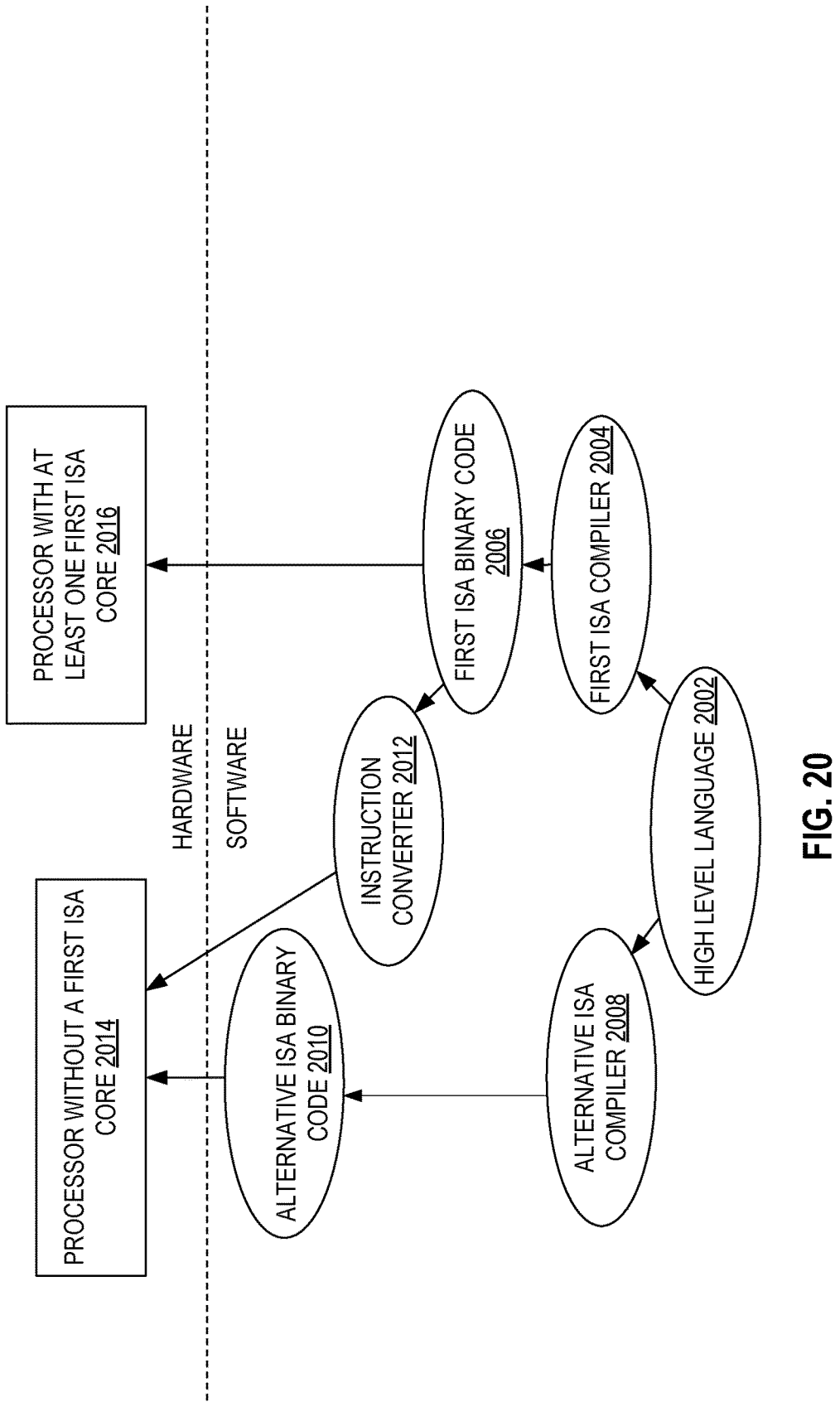
FIG. 20 is a block diagram illustrating the use of a software instruction converter to convert binary instructions in a source instruction set architecture to binary instructions in a target instruction set architecture according to examples.

FIG. 20 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 20 shows a program in a high-level language 2002 may be compiled using a first ISA compiler 2004 to generate first ISA binary code 2006 that may be natively executed by a processor with at least one first ISA core 2016. The processor with at least one first ISA core 2016 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2004 represents a compiler that is operable to generate first ISA binary code 2006 (e.g., object code) that can, with or without additional linkage processing, be executed on the processor with at least one first ISA core 2016. Similarly, FIG. 20 shows the program in the high-level language 2002 may be compiled using an alternative ISA compiler 2008 to generate alternative ISA binary code 2010 that may be natively executed by a processor without a first ISA core 2014. The instruction converter 2012 is used to convert the first ISA binary code 2006 into code that may be natively executed by the processor without a first ISA core 2014. This converted code is not necessarily to be the same as the alternative ISA binary code 2010; however, the converted code will accomplish the general operation and be made up of instructions from the alternative ISA. Thus, the instruction converter 2012 represents software, firmware, hardware, or a combination thereof that, through emulation, simulation or any other process, allows a processor or other electronic device that does not have a first ISA processor or core to execute the first ISA binary code 2006.

Examples include, but are not limited to:

1. An apparatus comprising:
   decode circuitry to decode an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and
   the execution circuitry to execute the decoded instruction according to the opcode.

2. The apparatus of example 1, wherein the field for the identification of the first source operand is to identify a vector register.

3. The apparatus of example 1, wherein the field for the identification of the first source operand is to identify a memory location.

4. The apparatus of example 1, wherein the execution circuitry is to treat denormal data elements as zeros during execution of the decoded instruction.

5. The apparatus of example 1, wherein the execution circuitry is to suppress numerical flags during execution of the decoded instruction.

6. The apparatus of example 1, wherein the instruction is to further include one or more fields for a writemask register.

7. The apparatus of example 1, wherein the instruction is to further include one or more fields for a predication register.

8. A system comprising:
   memory to store an instance of a single instruction;
   decode circuitry to decode the instance of the single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and
   the execution circuitry to execute the decoded instruction according to the opcode.

9. The system of example 8, wherein the field for the identification of the first source operand is to identify a vector register.

10. The system of example 8, wherein the field for the identification of the first source operand is to identify a memory location.

11. The system of example 8, wherein the execution circuitry is to treat denormal data elements as zeros during execution of the decoded instruction.

12. The system of example 8, wherein the execution circuitry is to suppress numerical flags during execution of the decoded instruction.

13. The system of example 8, wherein the instruction is to further include one or more fields for a writemask register.

14. The system of example 8, wherein the instruction is to further include one or more fields for a predication register.

15. A method comprising:
   decoding an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and
   executing the decoded instruction according to the opcode.

16. The method of example 15, wherein the field for the identification of the first source operand is to identify a vector register.

17. The method of example 15, wherein the field for the identification of the first source operand is to identify a memory location.

18. The method of example 15, wherein the execution circuitry is to treat denormal data elements as zeros during execution of the decoded instruction.

19. The method of example 15, wherein the instruction is to further include one or more fields for a predication register.

20. The method of example 15, further comprising:

decoding the single instruction into one or more instructions of a second instruction set architecture, wherein the executing comprises executing the one or more instructions of a second instruction set architecture.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decode circuitry to decode an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and the execution circuitry to execute the decoded instruction according to the opcode.

2. The apparatus of claim 1, wherein the field for the identification of the first source operand is to identify a vector register.

3. The apparatus of claim 1, wherein the field for the identification of the first source operand is to identify a memory location.

4. The apparatus of claim 1, wherein the execution circuitry is to treat denormal data elements as zeros during execution of the decoded instruction.

5. The apparatus of claim 1, wherein the execution circuitry is to suppress numerical flags during execution of the decoded instruction.

6. The apparatus of claim 1, wherein the instruction is to further include one or more fields for a writemask register.

7. The apparatus of claim 1, wherein the instruction is to further include one or more fields for a predication register.

8. A system comprising:

memory to store an instance of a single instruction;

decode circuitry to decode the instance of the single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and the execution circuitry to execute the decoded instruction according to the opcode.

9. The system of claim 8, wherein the field for the identification of the first source operand is to identify a vector register.

10. The system of claim 8, wherein the field for the identification of the first source operand is to identify a memory location.

11. The system of claim 8, wherein the execution circuitry is to treat denormal data elements as zeros during execution of the decoded instruction.

12. The system of claim 8, wherein the execution circuitry is to suppress numerical flags during execution of the decoded instruction.

13. The system of claim 8, wherein the instruction is to further include one or more fields for a writemask register.

14. The system of claim 8, wherein the instruction is to further include one or more fields for a predication register.

15. A method comprising:

decoding an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a FP8 data element in that position and store a result of each square root into a corresponding data element position of the packed data destination operand, wherein the 8-bit floating point data has one bit for a sign, four bits for an exponent, and three bits for a fraction; and executing the decoded instruction according to the opcode.

16. The method of claim 15, wherein the field for the identification of the first source operand is to identify a vector register.

17. The method of claim 15, wherein the field for the identification of the first source operand is to identify a memory location.

18. The method of claim 15, wherein the execution circuitry is to treat denormal data elements as zeros during execution of the decoded instruction.

19. The method of claim 15, wherein the instruction is to further include one or more fields for a predication register.

20. The method of claim 15, further comprising:

decoding the single instruction into one or more instructions of a second instruction set architecture, wherein the executing comprises executing the one or more instructions of a second instruction set architecture.

* * * * *